(12) United States Patent
Yokoya

(10) Patent No.: US 6,199,093 B1
(45) Date of Patent: Mar. 6, 2001

(54) PROCESSOR ALLOCATING METHOD/ APPARATUS IN MULTIPROCESSOR SYSTEM, AND MEDIUM FOR STORING PROCESSOR ALLOCATING PROGRAM

(75) Inventor: Yuji Yokoya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/683,417

(22) Filed: Jul. 18, 1996

(30) Foreign Application Priority Data

Jul. 21, 1995 (JP) .................................................. 7-184549

(51) Int. Cl.[7] ........................................................ G06F 9/00
(52) U.S. Cl. ............................................. 709/102; 709/100
(58) Field of Search .................................... 709/100, 102, 709/106, 104, 101, 103, 107; 712/12

(56) References Cited

U.S. PATENT DOCUMENTS 5,021,945 * 6/1991 Morrison et al. ..................... 395/392
5,452,461 * 9/1995 Umekita et al. ...................... 395/706
5,689,722 * 11/1997 Swarztrauber ......................... 712/12

FOREIGN PATENT DOCUMENTS 2-226358    9/1990  (JP) .

* cited by examiner

Primary Examiner—Majid Banankhah
(74) Attorney, Agent, or Firm—Young & Thompson

(57) ABSTRACT

In a processor allocating apparatus employed in a multiprocessor system capable of executing a plurality of tasks in a parallel manner, a compiler compiles a source program of a program constructed of parallel tasks to produce a target program 3, and also to produce a communication amount table for tasks, which holds therein a data amount of communication process operations executed among the respective tasks of the parallel tasks. While referring to both the communication amount table for tasks, and a processor communication cost table for defining data communication time per unit data in sets of all processors employed in the scheduler makes a decision such that a processor where communication time among the tasks becomes minimum is allocated to the task of the parallel tasks, and registers this decision to a processor management table.

24 Claims, 7 Drawing Sheets

| Processor number | | | | |
|---|---|---|---|---|
| | 1 | 2 | ... | n |
| 1 | $c_{11}$ | $c_{12}$ | ... | $c_{1n}$ |
| 2 | $c_{21}$ | $c_{22}$ | ... | $c_{2n}$ |
| ⋮ | ⋮ | ⋮ | ⋱ | ⋮ |
| n | $c_{n1}$ | $c_{n2}$ | ... | $c_{nn}$ |

Processor number (row label)

Task number

| | 1 | 2 | ... | n |
|---|---|---|---|---|
| 1 | $M_{11}$ | $M_{12}$ | ... | $M_{1n}$ |
| 1 | $M_{21}$ | $M_{22}$ | ... | $M_{2n}$ |
| ⋮ | ⋮ | ⋮ | ⋱ | ⋮ |
| n | $M_{n1}$ | $M_{n2}$ | ... | $M_{nn}$ |

Task number

| Processor number | 1 | 2 | 3 | ... | N |
|---|---|---|---|---|---|
| Task number | $T_1$ | $T_2$ | $T_3$ | ... | $T_N$ |

FIG. 4

$$\sum_{m \in P} C_{mn} XM_{j(M)i}$$

FIG. 6

PROCESSOR ALLOCATING METHOD/ APPARATUS IN MULTIPROCESSOR SYSTEM, AND MEDIUM FOR STORING PROCESSOR ALLOCATING PROGRAM

BACKGROUND OF THE INVENTION

1. Field of the Invention

The present invention relates to a processor allocating method and a processor allocating system used in a multiprocessor system for allocating processors to tasks executed in a parallel mode in this multiprocessor system, and also relates to a storage medium capable of storing a processor allocation program.

2. Description of the Related Art

In a multiprocessor system, a process operation of a single program is subdivided into a plurality of tasks, and then the plural tasks are executed by a plurality of processors in a parallel manner, so that turn around time of this program may be reduced. These tasks are called "parallel tasks". To shorten the turn around time of the program constituted by the parallel tasks, it is important to allocate the processors to the respective tasks in a high efficiency.

On the other hand, when a process operation of a single program is subdivided into a plurality of tasks to be executed, communications must be carried out among the respective tasks. It is also important for improving process performances to reduce overheads required for these task communications.

Generally speaking, communication times established among these processors for constituting a multiprocessor are different from each other, depending upon connection types among processors and physical distances among processors.

For instance, in such a multiprocessor system arranged by coupling a plurality of nodes with each other via a network, which are constructed of plural processors coupled by shared memories, communication speeds among the processors connected via the network are very slower than those among the processors connected via the shared memories.

In a hipercube-connected multiprocessor system, when each of tasks for constituting parallel tasks is executed on a multiprocessor, one scheduling method is described in Japanese Kokai Patent Application No. 2-226358. That is, the respective tasks are allocated to the processors of the multiprocessor system in order to reduce the overhead of the communication process operations executed among the processors.

In this scheduling method, the tasks are allocated to the processors in such a manner that the coincident degrees between the structures of the task graphs for representing the relationship among the tasks and the structures of the hypercubes become maximum.

However, the multiprocessor system to which this conventional scheduling method can be applied is limited only to the hypercube-connected type multiprocessor system. Therefore, there is a problem that this scheduling method cannot be applied to any other types of multiprocessor systems.

As known in the art, the communication times would be greatly varied in accordance with the communication amounts executed among the processors. Since the processors are allocated to the tasks without considering the communication amounts among the tasks, there is another problem. That is, very lengthy communication time among the tasks is required when two processors whose communication times become very long are allocated to such two tasks that data communication amounts between these two tasks are very large.

SUMMARY AND OBJECTS OF THE INVENTION

An object of the present invention is to shorten turn around time of a program constituted by parallel tasks, and executed in a multiprocessor system.

Another object of the present invention is to allocate a processor to each task of the parallel tasks in a multiprocessor system in such a manner that communication time required to perform a data communication among the tasks becomes minimum.

A further object of the present invention is to allocate a processor to each task of the parallel tasks in a multiprocessor system in such a way that data communication time per unit data amount becomes the shortest time.

A still further object of the present invention is to realize such a multiprocessor system that an amount of data communicated among tasks can be automatically collected.

A first processor allocating apparatus of the present invention, in a multiprocessor system capable of executing a plurality of tasks in a parallel manner, is comprised of:

task schedule means for allocating such a processor to a task to which the processor has not yet been allocated, among said plural tasks executed in the parallel manner, in such a manner that data communication time between the processor to be allocated and another processor already allocated to any of the plural tasks becomes minimum.

A second processor allocating apparatus of the present invention, in a multiprocessor system capable of executing a plurality of tasks in a parallel manner, is comprised of:

task schedule means for allocating such a processor to a task to which the processor has not yet been allocated, among said plural tasks executed in the parallel manner, in such a manner that data communication time per unit data between the processor to be allocated and another processor already allocated to any of the plural tasks becomes minimum.

A third processor allocating apparatus of the present invention, in a multiprocessor system capable of executing a plurality of tasks in a parallel manner, is comprised of:

task schedule means for allocating such a processor to a task to which the processor has not yet been allocated, among said plural tasks executed in the parallel manner, in such a manner that data communication time per unit data between the processor to be allocated and another processor already allocated to any of the plural tasks is multiplied by an amount of data communicated between said task and another task to which any of the processors has already been allocated to calculate communication time required for the data communication, and then said communication time required for the data communication becomes minimum.

A fourth processor allocating apparatus of the present invention, in a multiprocessor system capable of executing a plurality of tasks in a parallel manner, is comprised of:

compile means for compiling a source program in which said plurality of tasks executed in the parallel manner in said multiprocessor are defined to thereby produce a object program; and communication amount among tasks measuring object program means for storing therein an amount of data communicated between each of said plural tasks executed in the parallel manner and another tasks.

A fifth processor allocating apparatus of the present invention, according to a first processor allocating apparatus, is further comprised of:

compile means for compiling a source program in which said plurality of tasks executed in the parallel manner in said multiprocessor are defined to thereby produce a object program.

A sixth processor allocating apparatus of the present invention, according to a second processor allocating apparatus, is further comprised of:

compile means for compiling a source program in which said plurality of tasks executed in the parallel manner in said multiprocessor are defined to thereby produce a object program.

A seventh processor allocating apparatus of the present invention, according to a third processor allocating apparatus, is further comprised of:

compile means for compiling a source program in which said plurality of tasks executed in the parallel manner in said multiprocessor are defined to thereby produce a object program; and communication amount among tasks measuring object program means for storing therein an amount of data communicated between each of said plural tasks executed in the parallel manner and another task.

An eighth processor allocating apparatus of the present invention, according to a fourth processor allocating apparatus is characterized by that:

said communication amount among tasks measuring object program means seeks a task communication command within each of said plural tasks executed in the parallel manner, and stores therein an amount of data communicated by said task with another task in response to said task communication command.

A ninth processor allocating apparatus of the present invention, according to a seventh processor allocating apparatus is characterized by that:

said communication amount among tasks measuring object program means seeks a task communication command within each of said plural tasks executed in the parallel manner, and stores therein an amount of data communicated by said task with another task in response to said task communication command.

A tenth processor allocating apparatus of the present invention, in a multiprocessor system capable of executing a plurality of tasks in a parallel manner, is comprised of:

processor communication cost table holding therein data communication time per unit data between two arbitrary processors as an element of a matrix, which is exclusively constituted by a set of processor numbers of said two arbitrary processors;

a processor management table for holding therein a corresponding relationship between a task number of each of said plural tasks executed in the parallel manner and a processor number of a processor allocated to said task;

compile means for compiling a source program in which said plurality of tasks executed in the parallel manner in said multiprocessor are defined to thereby produce a object program; and task schedule means for obtaining such a processor from said processor communication table so as to allocate said processor to a task to which the processor has not yet been allocated, among said plural tasks executed in the parallel manner, in such a way that data communication time between the processor to be allocated and another processor already allocated to any of the plural tasks becomes minimum, and also for registering a corresponding relationship between a task number of said task and a processor number of said processor allocated thereto.

An eleventh processor allocating apparatus of the present invention, in a multiprocessor system capable of executing a plurality of tasks in a parallel manner, is comprised of:

a communication amount table for tasks, which holds therein an amount of data communicated between two arbitrary tasks executed in said multiprocessor in the parallel manner as an element of a matrix, exclusively constituted by a set of task numbers of said two arbitrary tasks;

processor communication cost table holding therein data communication time per unit data between two arbitrary processors as an element of a matrix, which is exclusively constituted by a set of processor numbers of said two arbitrary processors;

a processor management table for holding therein a corresponding relationship between a task number of each of said plural tasks executed in the parallel manner and a processor number of a processor allocated to said task;

compile means for compiling a source program in which said plurality of tasks executed in the parallel manner in said multiprocessor are defined to thereby produce a object program, for producing said communication amount table for tasks as to said plurality of tasks executed in the parallel manner and defined in said source program, for seeking a task communication command within each of said plural tasks executed in the parallel manner, and for adding an amount of data communicated by said task with another task in response to said task communication command; and task schedule means for acquiring data communication time per unit data between a processor to be allocated and another processor already allocated to any of the plural tasks from said processor communication cost table, for acquiring an amount of data communicated between said task and another task to which any one of the processors has already been allocated from said task communication amount table, for multiplying said data communication time per said unit data by the data amount of said communication to thereby calculate communication time required for the data communication, whereby such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table.

A twelfth processor allocating apparatus of the present invention, in a multiprocessor system capable of executing a plurality of tasks in a parallel manner, is comprised of:

a communication amount table for tasks, which holds therein an amount of data communicated between two arbitrary tasks executed in said multiprocessor in the parallel manner as an element of a matrix, exclusively constituted by a set of task numbers of said two arbitrary tasks;

processor communication cost table holding therein data communication time per unit data between two arbitrary processors as an element of a matrix, which is exclusively constituted by a set of processor numbers of said two arbitrary processors;

a processor management table for holding therein a corresponding relationship between a task number of each of said plural tasks executed in the parallel manner and a processor number of a processor allocated to said task;

compile means for compiling a source program in which said plurality of tasks executed in the parallel manner in said multiprocessor are defined to thereby produce a object program;

communication amount among tasks measuring object program means for producing said communication amount table for tasks as to a plurality of tasks executed in the parallel manner and defined in said source program, for seeking a task communication command within each of said plural tasks executed in the parallel manner, and for adding an amount of data communicated by said task with another task in response to said task communication command to an element of a set of task numbers corresponding thereto stored in said communication amount table for tasks; and task schedule means for acquiring data communication time per unit data between a processor to be allocated and another processor already allocated to any of the plural tasks from said processor communication cost table, for acquiring an amount of data communicated between said task and another task to which any one of the processors has already been allocated from said task communication amount table, for multiplying said data communication time per said unit data by the data amount of said communication to thereby calculate communication time required for the data communication, whereby such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table.

A first processor allocating method of the present invention, used in a multiprocessor system capable of executing a plurality of tasks in a parallel manner, involves:

a task schedule step for allocating such a processor to a task to which the processor has not yet been allocated, among said plural tasks executed in the parallel manner, in such a manner that data communication time between the processor to be allocated and another processor already allocated to any of the plural tasks becomes minimum.

A second processor allocating method of the present invention, used in a multiprocessor system capable of executing a plurality of tasks in a parallel manner, involves:

a task schedule step for allocating such a processor to a task to which the processor has not yet been allocated, among said plural tasks executed in the parallel manner, in such a manner that data communication time per unit data between the processor to be allocated and another processor already allocated to any of the plural tasks becomes minimum.

A third processor allocating method of the present invention, used in a multiprocessor system capable of executing a plurality of tasks in a parallel manner, involves:

a task schedule step for allocating such a processor to a task to which the processor has not yet been allocated, among said plural tasks executed in the parallel manner, in such a manner that data communication time per unit data between the processor to be allocated and another processor already allocated to any of the plural tasks is multiplied by an amount of data communicated between said task and another task to which any of the processors has already been allocated to calculate communication time required for the data communication, and then said communication time required for the data communication becomes minimum.

A fourth processor allocating method of the present invention, used in a multiprocessor system capable of executing a plurality of tasks in a parallel manner, involves:

a compile step for compiling a source program in which said plurality of tasks executed in the parallel manner in said multiprocessor are defined to thereby produce a object program; and a communication amount among tasks measuring object program step for storing therein an amount of data communicated between each of said plural tasks executed in the parallel manner and another task.

A fifth processor allocating method of the present invention, according to a first processor allocating method, further involves:

a compile step for compiling a source program in which said plurality of tasks executed in the parallel manner in said multiprocessor are defined to thereby produce a object program.

A sixth processor allocating method of the present invention, according to a second processor allocating method, further involves:

a compile step for compiling a source program in which said plurality of tasks executed in the parallel manner in said multiprocessor are defined to thereby produce a object program.

A seventh processor allocating method of the present invention, according to a third processor allocating method, further involves:

a compile step for compiling a source program in which said plurality of tasks executed in the parallel manner in said multiprocessor are defined to thereby produce a object program; and a communication amount among tasks measuring object program step for storing therein an amount of data communicated between each of said plural tasks executed in the parallel manner and another task.

An eighth processor allocating method of the present invention, according to a fourth processor allocating method is characterized by that:

said communication amount among tasks measuring object program step seeks a task communication command within each of said plural tasks executed in the parallel manner, and stores therein an amount of data communicated by said task with another task in response to said task communication command.

A ninth processor allocating method of the present invention, according to a seventh processor allocating method is characterized by that:

said communication amount among tasks measuring object program step seeks a task communication command within each of said plural tasks executed in the parallel manner, and stores therein an amount of data communicated by said task with another task in response to said task communication command.

A tenth processor allocating method of the present invention used in a multiprocessor system capable of executing a plurality of tasks in a parallel manner, involves:

a compile step for compiling a source program in which said plurality of tasks executed in the parallel manner in said multiprocessor are defined to thereby produce a object program; and a task schedule step for obtaining such a processor from communication cost table for processor so as to allocate said processor to a task to which the processor has not yet been allocated, among said plural tasks executed in the parallel manner, in such a way that data communication time per unit data between the processor to be allocated and another processor already allocated to any of the plural tasks becomes minimum, said communication cost table for processors holding therein data communication time per unit data between two arbitrary processors as an element of a matrix, exclusively defined by a set of processor numbers of said two arbitrary processors, and also for registering a corresponding relationship a task number of said task and a processor number of said processor allocated thereto into such a processor management table for holding therein a corresponding relationship the respective task numbers of said plural tasks executed in the parallel manner and a processor number of the processor allocated to said task.

An eleventh processor allocating method of the present invention, used in a multiprocessor system capable of executing a plurality of tasks in a parallel manner, involves:

a compile step for compiling a source program in which said plurality of tasks executed in the parallel manner in said multiprocessor are defined to thereby produce a object program, for producing said communication amount table for tasks, which holds an amount of data communicated between two arbitrary tasks, as an element of a matrix exclusively constituted by a set of task numbers of said two arbitrary tasks, among said plurality of tasks executed in the parallel manner and defined in said source program, for seeking a task communication command within each of said plural tasks executed in the parallel manner, and for adding an amount of data communicated by said task with another task in response to said task communication command, to an element of the set of the corresponding task number stored in said communication amount table for tasks; and a task schedule step for acquiring data communication time per unit data between a processor to be allocated and another processor already allocated to any of the plural tasks from a processor communication cost table which holds therein data communication time per unit data between two arbitrary processors as an element of a matrix exclusively defined by a set of processor numbers of said two arbitrary processors, for acquiring an amount of data communicated between said task and another task to which any one of the processors has already been allocated from said task communication amount table, for multiplying said data communication time per said unit data by the data amount of said communication to thereby calculate communication time required for the data communication, whereby such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table which holds therein a corresponding relationship between the respective task numbers of said plural tasks executed in the parallel manner and the processor numbers of the processors allocated to said tasks.

A twelfth processor allocating method of the present invention, used in a multiprocessor system capable of executing a plurality of tasks in a parallel manner, involves:

a compile step for compiling a source program in which said plurality of tasks executed in the parallel manner in said multiprocessor are defined to thereby produce a object program;

a communication amount among tasks measuring object program step for producing a communication amount table for tasks, which holds therein an amount of data communicated between two arbitrary tasks among a plurality of tasks executed in the parallel manner and defined in said source program, as an element of a matrix exclusively defined by a set of task numbers of said two tasks, for seeking a task communication command within each of said plural tasks executed in the parallel manner, and for adding an amount of data communicated by said task with another task in response to said task communication command to an element of a set of task numbers corresponding thereto stored in said communication amount table for tasks; and a task schedule step for acquiring data communication time per unit data between a processor to be allocated and another processor already allocated to any of the plural tasks from a processor communication cost table which holds therein data communication time per unit data between two arbitrary processors as an element of a matrix exclusively defined by a set of processor numbers of said two arbitrary processors, for acquiring an amount of data communicated between said task and another task to which any one of the processors has already been allocated from said task communication amount table, for multiplying said data communication time per said unit data by the data amount of said communication to thereby calculate communication time required for the data communication, whereby such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table which holds therein a corresponding relationship between the respective task numbers of said plural tasks executed in the parallel manner and the processor numbers of the processors allocated to said tasks.

A first medium of the present invention, for storing therein a processor allocation program for causing a multiprocessor system capable of executing a plurality of tasks in a parallel manner to perform a process operation involving the following steps:

a task schedule step for allocating such a processor to a task to which the processor has not yet been allocated, among said plural tasks executed in the parallel manner, in such a manner that data communication time between the processor to be allocated and another processor already allocated to any of the plural tasks becomes minimum.

A second medium of the present invention, for storing therein a processor allocation program for causing a multiprocessor system capable of executing a plurality of tasks in a parallel manner to perform a process operation involving the following steps:

a task schedule step for allocating such a processor to a task to which the processor has not yet been allocated, among said plural tasks executed in the parallel manner, in such a manner that data communication time per unit data between the processor to be allocated and another processor already allocated to any of the plural tasks becomes minimum.

A third medium of the present invention, for storing therein a processor allocation program for causing a multiprocessor system capable of executing a plurality of tasks in a parallel manner to perform a process operation involving the following steps:

a task schedule step for allocating such a processor to a task to which the processor has not yet been allocated, among said plural tasks executed in the parallel manner, in such a manner that data communication time per unit data between the processor to be allocated and another processor already allocated to any of the plural tasks is multiplied by an amount of data communicated between said task and another task to which any of the processors has already been allocated to calculate communication time required for the data communication, and then said communication time required for the data communication becomes minimum.

A fourth medium of the present invention, for storing therein a processor allocation program for causing a multiprocessor system capable of executing a plurality of tasks in a parallel manner to perform a process operation involving the following steps:

a compile step for compiling a source program in which said plurality of tasks executed in the parallel manner in said multiprocessor are defined to thereby produce a target program; and a communication amount among tasks measuring target program step for storing therein an amount of data communicated between each of said plural tasks executed in the parallel manner and another task.

A fifth medium of the present invention, for storing a processor allocation program for causing a multiprocessor system to perform a process operation, according to a first medium, further involving the following steps:

a compile step for compiling a source program in which said plurality of tasks executed in the parallel manner in said multiprocessor are defined to thereby produce a object program.

A sixth medium of the present invention, for storing a processor allocation program for causing a multiprocessor system to perform a process operation, according to a second medium, further involving the following steps:

a compile step for compiling a source program in which said plurality of tasks executed in the parallel manner in said multiprocessor are defined to thereby produce a object program.

A seventh medium of the present invention, for storing a processor allocation program for causing a multiprocessor system to perform a process operation, according to a third medium, further involving the following steps:

a compile step for compiling a source program in which said plurality of tasks executed in the parallel manner in said multiprocessor are defined to thereby produce a object program; and a communication amount among tasks measuring object program step for storing therein an amount of data communicated between each of said plural tasks executed in the parallel manner and another task.

An eighth medium of the present invention, for storing a processor allocation program for causing a multiprocessor system to perform a process operation, according to a fourth medium, is characterized by that:

said communication amount among tasks measuring object program step seeks a task communication command within each of said plural tasks executed in the parallel manner, and stores therein an amount of data communicated by said task with another task in response to said task communication command.

A ninth medium of the present invention, for storing a processor allocation program for causing a multiprocessor system to perform a process operation, according to a seventh medium, is characterized by that:

said communication amount among tasks measuring target program step seeks a task communication command within each of said plural tasks executed in the parallel manner, and stores therein an amount of data communicated by said task with another task in response to said task communication command.

A tenth medium of the present invention, for storing therein a processor allocation program for causing a multiprocessor system capable of executing a plurality of tasks in a parallel manner to perform a process operation involving the following steps:

a compile step for compiling a source program in which said plurality of tasks executed in the parallel manner in said multiprocessor are defined to thereby produce a object program; and a task schedule step for obtaining such a processor from communication cost table for processor so as to allocate said processor to a task to which the processor has not yet been allocated, among said plural tasks executed in the parallel manner, in such a way that data communication time per unit data between the processor to be allocated and another processor already allocated to any of the plural tasks becomes minimum, said communication cost table for processors holding therein data communication time per unit data between two arbitrary processors as an element of a matrix, exclusively defined by a set of processor numbers of said two arbitrary processors, and also for registering a corresponding relationship a task number of said task and a processor number of said processor allocated thereto into such a processor management table for holding therein a corresponding relationship the respective task numbers of said plural tasks executed in the parallel manner and a processor number of the processor allocated to said task.

An eleventh medium of the present invention, for storing therein a processor allocation program for causing a multiprocessor system capable of executing a plurality of tasks in a parallel manner to perform a process operation involving the following steps:

a compile step for compiling a source program in which said plurality of tasks executed in the parallel manner in said multiprocessor are defined to thereby produce a object program, for producing said communication amount table for tasks, which holds an amount of data communicated between two arbitrary tasks, as an element of a matrix exclusively constituted by a set of task numbers of said two arbitrary tasks, among said plurality of tasks executed in the parallel manner and defined in said source program, for seeking a task communication command within each of said plural tasks executed in the parallel manner, and for adding an amount of data communicated by said task with another task in response to said task communication command, to an element of the set of the corresponding task number stored in said communication amount table for tasks; and a task schedule step for acquiring data communication time per unit data between a processor to be allocated and another processor already allocated to any of the plural tasks from a processor communication cost table which holds therein data communication time per unit data between two arbitrary processors as an element of a matrix exclusively defined by a set of processor numbers of said two arbitrary processors, for acquiring an amount of data communicated between said task and another task to which any one of the processors has already been allocated from said task communication amount table, for multiplying said data communication time per said unit data by the data amount of said communication to thereby calculate communication time required for the data communication, whereby such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table which holds therein a corresponding relationship between the respective task numbers of said plural tasks executed in the parallel manner and the processor numbers of the processors allocated to said tasks.

A twelfth medium of the present invention, for storing therein a processor allocation program for causing a multiprocessor system capable of executing a plurality of tasks in a parallel manner to perform a process operation involving the following steps:

a compile step for compiling a source program in which said plurality of tasks executed in the parallel manner in said multiprocessor are defined to thereby produce a object program;

a communication amount among tasks measuring object program step for producing a communication amount table for tasks, which holds therein an amount of data communicated between two arbitrary tasks among a plurality of tasks executed in the parallel manner and defined in said source program, as an element of a matrix exclusively defined by a set of task numbers of said two tasks, for seeking a task communication command within each of said plural tasks executed in the parallel manner, and for adding an amount of data communicated by said task with another task in response to said task communication command to an element of a set of task numbers corresponding thereto stored in said communication amount table for tasks; and a task schedule step for acquiring data communication time per unit data between a processor to be allocated and another processor already allocated to any of the plural tasks from a processor communication cost table which holds therein data communication time per unit data between two arbitrary processors as an element of a matrix exclusively defined by a set of processor numbers of said two arbitrary processors, for acquiring an amount of data communicated between said task and another task to which any one of the processors has already been allocated from said task communication amount table, for multiplying said data communication time per said unit data by the data amount of said communication to thereby calculate communication time required for the data communication, whereby such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table which holds therein a corresponding relationship between the respective task numbers of said plural tasks executed in the parallel manner and the processor numbers of the processors allocated to said tasks.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

FIG. 2 illustrates a content of a processor communication cost table employed in the processor allocating apparatus according to first to third embodiments of the present invention;

FIG. 3 represents a content of a table 4 for storing communication amounts among tasks employed in the processor allocating apparatus according to the first to third embodiments of the present invention;

FIG. 4 shows a content of a processor management table 7 employed in the processor allocating apparatus according to the first to third embodiments of the present invention;

FIG. 6 represents a calculation formula employed in a processor allocating process operation executed by the task scheduler 5 of the processor allocating apparatus according to the first embodiment of the present invention;

Here, it should be noted that like reference numerals represent like elements throughout the disclosure.

DETAILED DESCRIPTION OF THE PREFERRED EMBODIMENTS

Referring now to drawings, various embodiments of the present invention will be described in detail.

Figure 1:
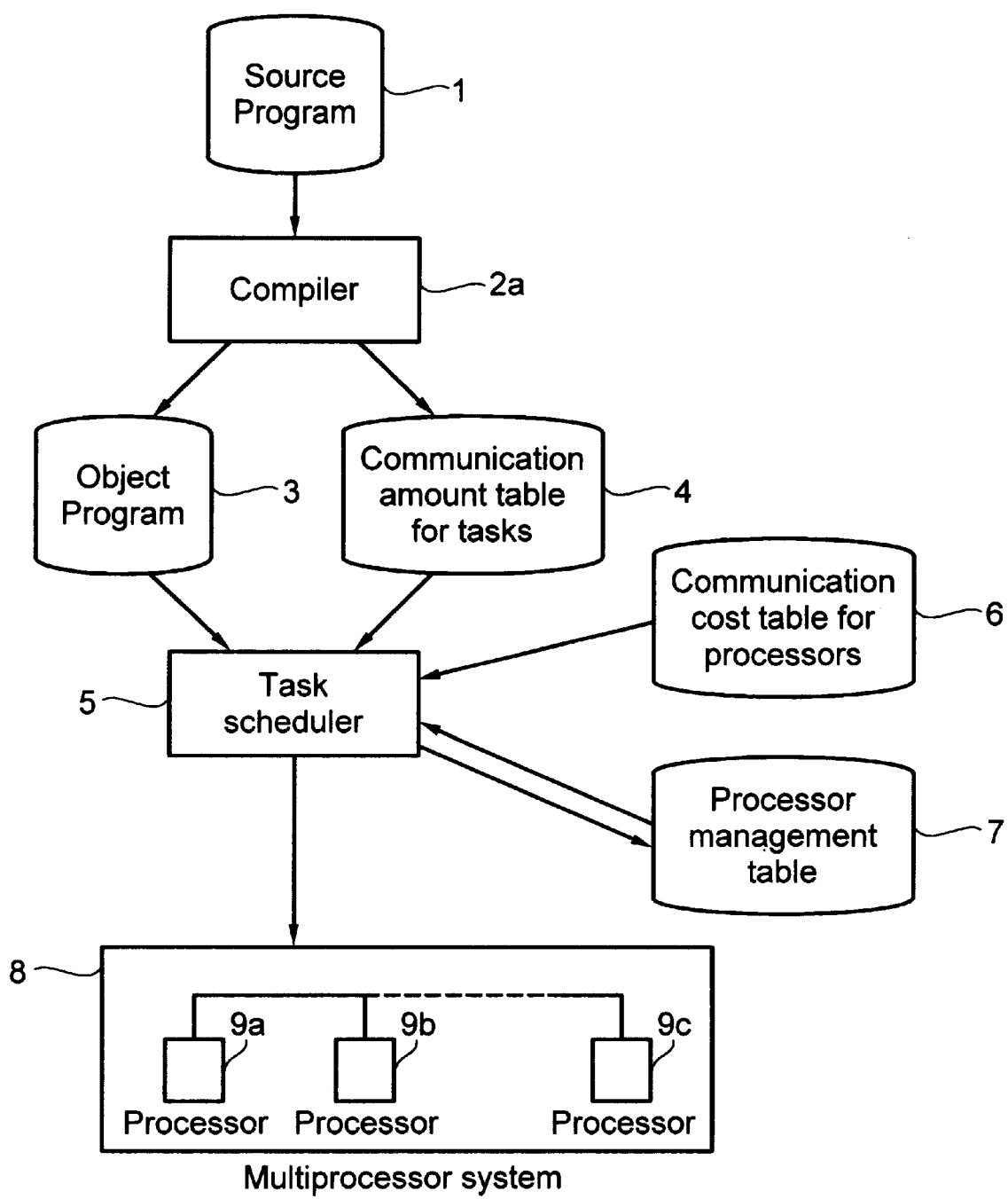
FIG. 1 is a schematic block diagram for representing an arrangement of a processor allocating apparatus used in a multiprocessor system according to first and second embodiments of the present invention.

FIG. 1 schematically shows a processor allocating apparatus used in a multiprocessor system, according to a first embodiment of the present invention.

The processor allocating apparatus used in the multiprocessor system, according to the first embodiment of the present invention, is arranged by a plurality of processors 9a, 9b and 9c for constituting a multiprocessor system 8; a source program 1 of a program constructed of parallel tasks; a compiler 2a for compiling this source program 1; a object program 3 produced by the compiler 2a; and a communication amount table 4 for holding a data amount of communication process operation executed among tasks of the parallel tasks. This processor allocating apparatus is further arranged by a task scheduler 5 for allocating processors to the respective tasks of the parallel tasks; a processor communication cost table 6 for defining data communication time per unit data in a set of all processors in the multiprocessor system 8; and a processor management table 7 for holding a corresponding relationship between the task and the processor allocated to this task.

In FIG. 2 there is shown a content of the processor communication cost table 6. In this processor communication cost table 6, when the multiprocessor system 8 is constructed of N pieces of processors, while 1st to Nth processor numbers are allocated to the respective processors, the data communication time per unit data amount between the processor "i" and the processor "j" is preset at an i-row/j-column element in a two-dimensional N×N arrangement.

Referring now to FIG. 1 to FIG. 4, FIG. 6 and FIG. 7, operations of the processor allocating apparatus according to the first embodiment of the present invention will now be described.

First, process operations of the compiler 2a will now be explained.

The compiler 2a inputs/translates the source program 1 containing the process operation by the parallel tasks (step 71) to thereby produce the object program 3 (step 72). Also, the compiler 2a produces the communication amount table 4 for tasks with respect to the parallel tasks defined in this object program 3 (step 73).

With reference to FIG. 3, the communication amount table 4 for tasks holds the data amounts of the communication process operations executed among the respective tasks of the parallel tasks. Assuming now that the number of tasks for constituting the parallel tasks is selected to be "N", this communication amount table 4 for tasks is expressed by such a two-dimensional N×N arrangement.

Figure 7:
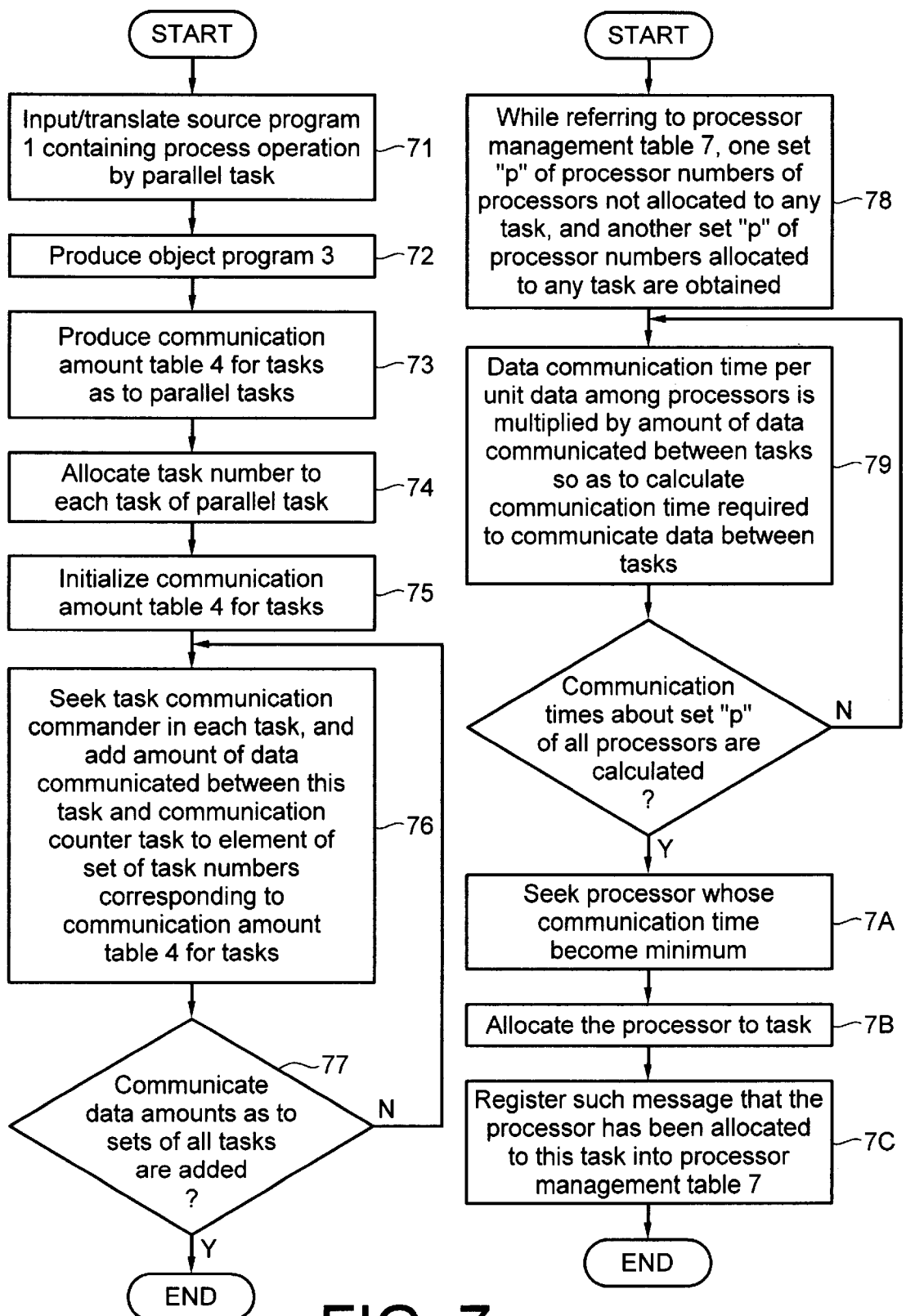
FIG. 7 is a flow chart for describing process operations of a compiler 2a and the task scheduler 5 according to the first embodiment of the present invention.

After the communication amount table 4 for tasks has been produced, the compiler 2a will set the respective elements contained in this communication amount table 4 for tasks in accordance with the below-mentioned sequence:

Again, in the flow chart of FIG. 7, the compiler 2a first allocates a first task number to an Nth task number to the respective tasks for constituting the parallel tasks (step 74).

Next, the compiler 2a initializes the respective elements contained in the communication amount table 4 for tasks (step 75).

Further, the compiler 2a seeks a task communication command among the tasks, and adds a data amount of a communication established between this task and a counterparty task to an element of a set of the corresponding task number contained in the communication amount table 4 for tasks (step 76). For example, when there is such a task communication command for transferring data having a dimension of "sj" to a task "j" in a task having a task number "i", "sj" is added to an element located at an i-row and a j-column of the communication amount table 4 for tasks. This process operation is carried out with respect to all of these tasks, so that the communication amount table 4 for tasks may be accomplished (step 77).

Subsequently, a description will now be made of a process operation such that when the object program 3 constituted by the parallel tasks is executed, the task scheduler 5 allocates the respective processors of the multiprocessor system 8 to each of the tasks.

Referring now to FIG. 4, the processor management table 7 holds the corresponding relationship between the tasks and the processors allocated to the relevant tasks. Under such an initial condition that the processors have not yet been allocated to any tasks, all of columns of the task numbers are initialized.

When the processor is allocated to such a task having a task number "i", the task scheduler 5 first refers to the processor management table 7 so as to obtain a set "p" of processor numbers for processors which have not yet been allocated to any tasks, and also another set "P" of processor numbers for processors which have been allocated to any tasks (step 78).

Figure 6:
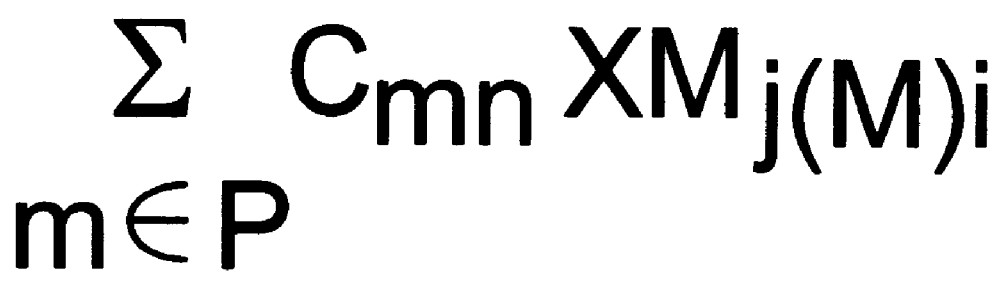

Next, the task scheduler 5 calculates values of a formula expressed in FIG. 6 as to all of the processors (assuming now that processor number is "n") belonging to the set "p" in order to allocate any one of the processors belonging to the set "p" to the task of the task number "i". In the formula shown in FIG. 6, symbol "m" indicates the processor number of the processor belonging to the set "P", and symbol "Cmn" represents data communication time per unit data, executed between the processor having the processor number "m" and the processor having the processor number "n", and calculated from the communication cost table 6 for processors. Symbol Mj(m)i denotes a data amount of communication process operation for tasks having a task number "j(m)" and another task number "i", to which the processor with the processor number "m" obtained from the processor management table 7 has been allocated, and this data amount is calculated from the communication amount table 4 for tasks.

In other words, the formula indicated in FIG. 6 is provided to calculate the communication time required for the data communication between the tasks by multiplying the data communication time per unit data between the processors by the amount of the data communicated between the tasks.

The task scheduler 5 executes the formula (6) of FIG. 6 (step 79) to seek a processor from the set "p" in such a manner that a value to be calculated is minimum, namely the communication time required for the data communication performed between the tasks becomes minimum (step 7A). Then, the task scheduler 5 allocates the sought processor to the task "i" (step 7B), and further sets "i" as the task number corresponding to the processor number "n" of this processor of the processor management table 7 (step 7C).

With a series the above-described operations, the processor allocation by the processor allocating apparatus in the multiprocessor system, according to the first embodiment of the present invention, is accomplished.

It should be noted that the task to which the processor has been allocated is performed by the operating system.

The processor allocating apparatus in the multiprocessor system, according to the first embodiment of the present invention, owns the following advantages. That is, in the multiprocessor system, when the processor is allocated to the respective tasks of the parallel tasks, this processor can be allocated to the relevant task in such a manner that the communication time required for the data communication effected among the respective tasks is minimized.

Also, as a second embodiment of the present invention, such a processor whose data communication time per unit data becomes the shortest time may be obtained from the communication cost table 6 for processors, between the set "P" of the processor number of the processor which has already been allocated to any of these tasks among the set "p" of the processor numbers of the processors which have not yet been allocated to any of the tasks, although the process operation of the task scheduler 5 is carried out in the first embodiment in such a way that the processor whose communication time required for the data communication between the tasks becomes the shortest time.

In accordance with the processor allocating apparatus used in the multiprocessor system, according to the second embodiment, when the processor is allocated to each task of the parallel tasks in this multiprocessor system, there is such a merit that the processor whose data communication time per unit data amount becomes the shortest time can be allocated thereto.

Different from the first embodiment in which the communication amount table 4 for tasks is produced by the compiler 2a, according to a third embodiment, while the compiler 2a compiles the source program 1 of the parallel tasks, this compiler 2a produces a communication amount among tasks measuring object program used to measure communication amounts among tasks. Then, this communication amount among tasks measuring object program may produce the communication amount table 4 for tasks.

Figure 5:
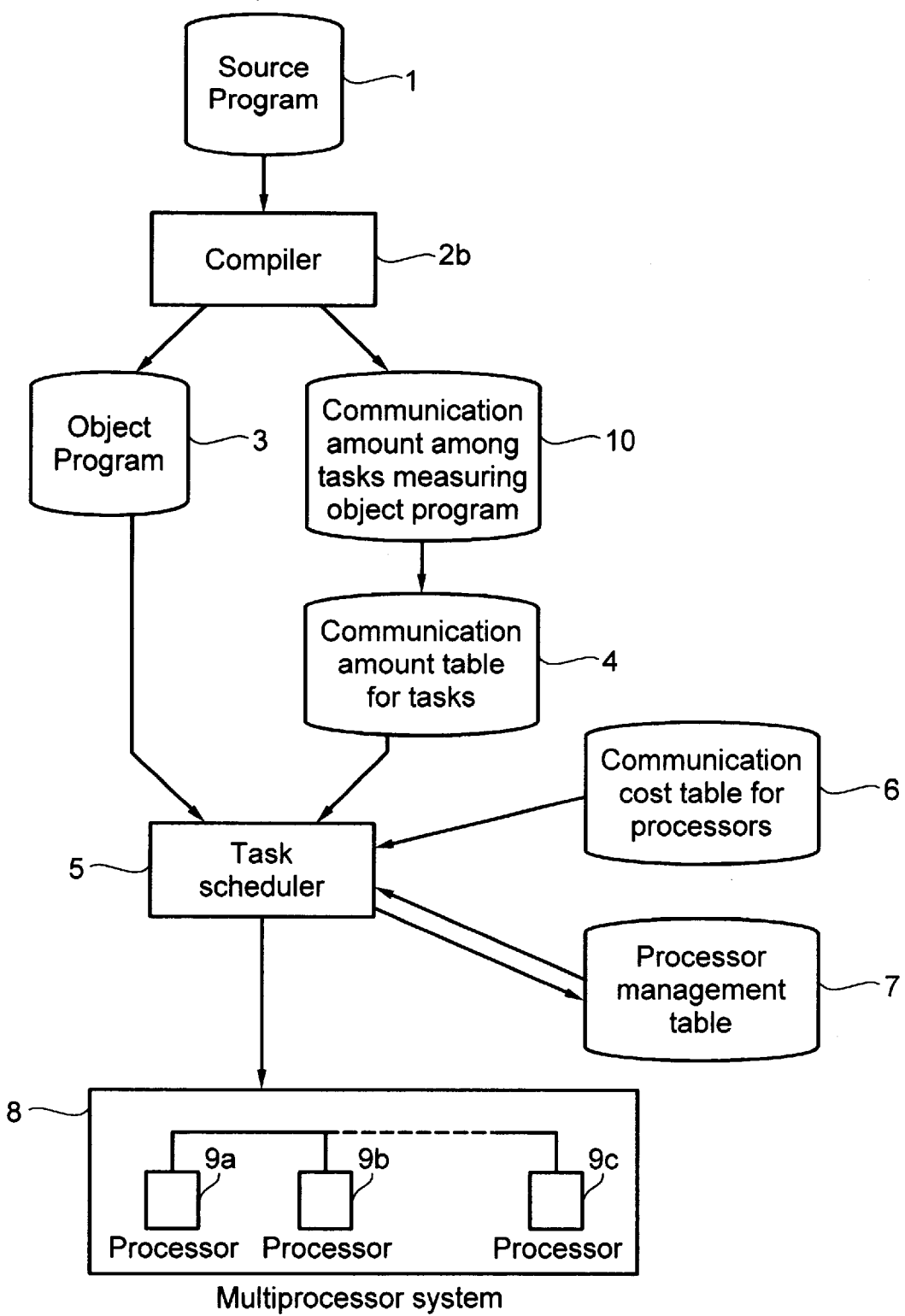
FIG. 5 is a schematic block diagram for indicating an arrangement of a processor allocating apparatus used in the multiprocessor system according to a third embodiment of the present invention.

Referring now to FIG. 5, a processor allocating apparatus used in a multiprocessor system, according to the third embodiment of the present invention, is constructed of a compiler 2b and a communication amount among tasks measuring object program 10 in addition to the arrangements of the first embodiment.

Figure 8:
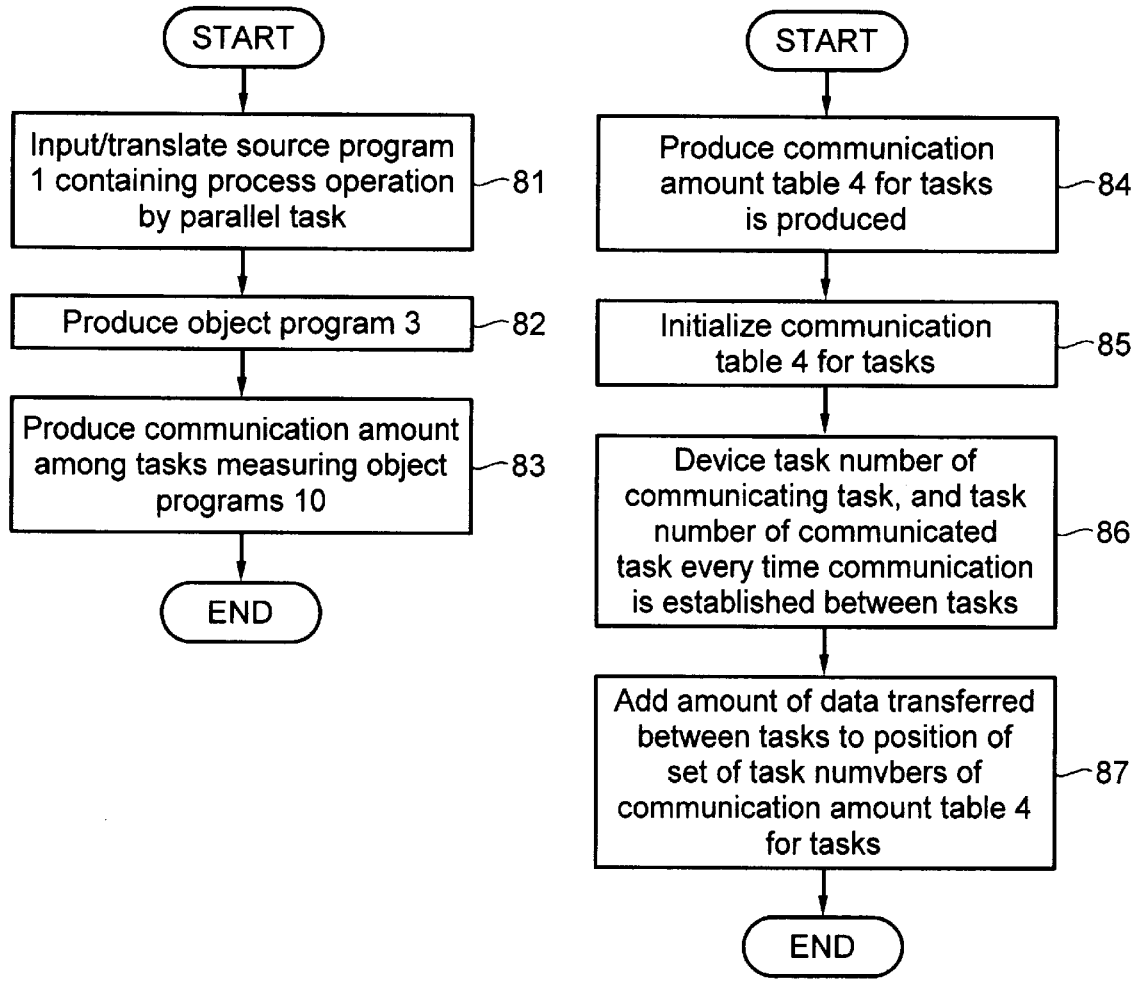
FIG. 8 is a flow chart for describing process operations of a compiler 2b and a program 10 aiming to measure communication amounts among tasks, employed in the processor allocating apparatus according to the third embodiment of the present invention.

Then, operations of this processor allocating apparatus according to the third embodiment of the present invention will now be explained with reference to FIG. 5 and FIG. 8.

Since the different operation of this third embodiment from the above-described operation of the first embodiment is only such a process operation by the compiler 2b and the communication amount among tasks measuring object program 10, this process operation will be described as follows:

That is, the compiler 2b inputs/translates the source program 1 containing the process operation by the parallel tasks (step 81) to thereby produce the target program 3 (step 82), and also to produce the communication amount among tasks measuring object program 10 (step 83).

The communication amount among tasks measuring object program 10 corresponds to a object program that such a process operation for registering a task number in a communication established among tasks, and a dimension of data to be communicated into the communication amount table 4 for tasks is added to a portion of the object program 3 for performing communications amount tasks. Now, operations of the communication amount among tasks measuring object program 10 will be explained.

First, when the task number of the object program 3 is selected to be "N", the communication amount among tasks measuring program 10 produces the communication amount table 4 in a two-dimensional N×N arrangement from (step 84), and initializes the respective elements (step 85).

Next, every time the communication among the tasks is carried out, the communication amount among tasks measuring target program 10 derives the task number of the task which performs this communication and the task number of the counter-party task (step 86), and adds the amount of data transferred during this communication among the tasks to the position of the set of these task numbers within the communication table 4 for tasks (step 87). When the execution of the communication amount among tasks measuring object program 10 is accomplished, the communication about table 4 for tables is made up.

With a series of the above-described operations, the processor allocating method executed in the multiprocessor system, according to the third embodiment of the present invention, is accomplished.

The processor allocating apparatus in the multiprocessor system, according to the third embodiment of the present invention, can own such a merit that the amount of data communicated among the tasks can be automatically collected during the communication among the tasks.

The processor allocating apparatus in the multiprocessor system, according to the present invention, owns the following features. That is, the compiler 2a compiles the source program 1 of the program constituted by the parallel tasks so as to produce the object program 3 and also the communication amount table 4 for tasks, which holds the data amount of the communication process operation performed in the respective tasks of the parallel tasks. While the task scheduler 5 refers to both the communication amount table 4 for task and the processor communication cost table 6 which defines the data communication time per unit data in the sets of all processors employed in the multiprocessor system 8, the time scheduler 5 makes such a decision that such a processor where the communication time among the tasks becomes minimum is allocated to the task of the parallel tasks, and then registers such a decision into the processor management table 7.

Since the processor allocating apparatus having this feature in the multiprocessor system, according to the present invention, there is such an advantage that the turn around time of the program constituted by the parallel tasks can be shortened in the multiprocessor system.

There is another effect that when the processor is allocated to the respective tasks of the parallel tasks in the multiprocessor system, this processor can be allocated to the relevant task in such a manner that the communication time required for the data communication established between the respective tasks becomes minimum.

Furthermore, there is another effect that when the processor is allocated to the respective task of the parallel tasks in the multiprocessor system, such a processor whose data communication time per unit data amount becomes the shortest time can be allocated to the relevant task.

In particular, these effects may be enhanced in such a case that the number of processors is larger than the number of tasks produced in the overall multiprocessor system. Moreover, these effects may also be greatly achieved in a hypercube-connected type multiprocessor system such that connecting types and physical distances are different from each other among processors.

In addition, there is a further effect that the amount of data communication among the tasks which perform the communications thereto can be automatically collected.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A processor allocating apparatus in a multiprocessor system including a plurality of processors, each of which processors can execute one of a plurality of tasks in a parallel manner, comprising:

a task schedule means for calculating data communication times required for data communication between the task in accordance with the data communication time per unit data between the processors and the amount of the data communicated between the tasks and allocating, at the start of task execution and with reference to a processor management table, each of said plurality of tasks to one processor of said plurality of processors not yet allocated to any task, sequentially in an order minimizing the data communication time per unit data between each processor of said plurality of processors and all other respective processors of said plurality of processors in accordance with the combination pattern for the shortest data communication time.

2. A processor allocating apparatus in a multiprocessor system including a plurality of processors, each of which processors can execute one of a plurality of tasks in a parallel manner, comprising:

an inter-task communication amount table for holding an amount of data communicated between each task of the plurality of tasks and other respective tasks of the plurality of tasks;

a processor communication cost table for holding data communication time per unit data between each processor and the other respective processors of said plurality of processors; and a task schedule means for calculating, at the start of task execution, data communication times required for data communication between the task in accordance with the data communication time per unit data between the processors and the amount of the data communicated between the other respective tasks on the basis of both said inter-task communication amount table and said processor communication cost table, with respect to each of all combination patterns of said tasks and said processors, and allocating said tasks to processors of said processors which processors have not yet been allocated to any task in accordance with the combination pattern for the shortest data communication time.

3. A processor allocating apparatus in a multiprocessor system as claimed in claim 1, further comprising:

a compile means for compiling a source program in which said plurality of tasks executed in the parallel manner in said multiprocessor are defined to thereby produce an object program.

4. A processor allocating apparatus in a multiprocessor system as claimed in claim 2, further comprising:

a compile means for compiling a source program in which said plurality of tasks executed in the parallel manner in said multiprocessor are defined to thereby produce an object program; and a communication amount among tasks measuring object program means for storing therein an amount of data communicated between each of said plural tasks executed in the parallel manner and another task.

5. A processor allocating apparatus in a multiprocessor system as claimed in claim 4, wherein:

said communication amount among tasks measuring object program means seeks a task communication command within each of said plural tasks executed in the parallel manner, and stores therein an amount of data communicated by said task with another task in response to said task communication command.

6. A processor allocating apparatus in a multiprocessor system capable of executing a plurality of tasks in a parallel manner, comprising:

a processor communication cost table holding therein a data communication time per unit data between two arbitrary processors as an element of a matrix, which matrix is exclusively constituted by a set of processor numbers of said two arbitrary processors;

a processor management table for holding therein a corresponding relationship between a task number of each of said plural tasks executed in the parallel manner and a processor number of a processor allocated to said task;

a compile means for compiling a source program in which said plurality of tasks executed in the parallel manner in said multiprocessor are defined to thereby produce an object program; and a task schedule means for obtaining such a processor which has not yet been allocated to any task from said processor communication table at the time of starting the execution of said tasks, so as calculate data communication times required for data communication between the task in accordance with the data communication time per unit data between the processors and the amount of the data communicated between the tasks and to allocate said processor to a task to which the processor has not yet been allocated, among said plural tasks executed in the parallel manner, in such a way that the data communication time between the processor to be allocated and another processor already allocated to any of the plural tasks becomes minimum in accordance with the combination pattern for the shortest data communication time, and also for registering a corresponding relationship between a task number of said task and a processor number of said processor allocated thereto.

7. A processor allocating apparatus in a multiprocessor system capable of executing a plurality of tasks in a parallel manner, comprising:

a communication amount table for tasks, which table holds therein an amount of data communicated between two arbitrary tasks executed in said multiprocessor in the parallel manner as an element of a matrix, exclusively constructed by a set of task numbers of said two arbitrary tasks;

a processor communication cost table holding therein a data communication time per unit data between two arbitrary processors as an element of a matrix, which table is exclusively constituted by a set of processor numbers of said two arbitrary processors;

a processor management table for holding therein a corresponding relationship between a task number of each of said plural tasks executed in the parallel manner and a processor number of a processor allocated to said task;

a compile means for compiling a source program in which said plurality of tasks executed in the parallel manner in said multiprocessor are defined to thereby produce an object program, for producing said communication amount table for tasks as to said plurality of tasks executed in the parallel manner and defined in said source program, for seeking a task communication command within each of said plural tasks executed in the parallel manner, and for adding an amount of data communicated by said task with another task in response to said task communication command; and a task schedule means for acquiring the data communication time per unit data between a processor to be allocated and another processor already allocated to any of the plural tasks from said processor communication cost table, for acquiring an amount of data communicated between said task and another task to which any one of the processors has already been allocated from said task communication amount table, for multiplying said data communication time per said unit data by the data amount of said communication to thereby calculate communication time required for the data communication by calculating data communication times required for data communication between the task in accordance with the data communication time per unit data between the processors and the amount of the data communicated between the tasks, wherein such a processor which has not yet been allocated to any task whose communication time required for said data communication becomes minimum is allocated to such a task to which no processor has been allocated among the plural tasks executed in the parallel manner in accordance with the combination pattern for the shortest data communication time, and also for registering a corresponding relationship between a task number of said task and a processor number of said processor into said processor management table, said task schedule means making said allocation when the executing of tasks is started.

8. A processor allocating apparatus in a multiprocessor system capable of executing a plurality of tasks in a parallel manner, comprising:
- a communication amount table for tasks, which table holds therein an amount of data communicated between two arbitrary tasks executed in said multiprocessor in the parallel manner as an element of a matrix, exclusively constituted by a set of task numbers of said two arbitrary tasks;
- a processor communication cost table holding therein a data communication time per unit data between two arbitrary processors as an element of a matrix, which matrix is exclusively constituted by a set of processor numbers of said two arbitrary processors;
- a processor management table for holding therein a corresponding relationship between a task number of each of said plural tasks executed in the parallel manner and a processor number of a processor allocated to said task;
- a compile means for compiling a source program in which said plurality of tasks executed in the parallel manner in said multiprocessor are defined to thereby produce an object program;
- a communication amount among tasks measuring object program means for producing said communication amount table for tasks as to a plurality of tasks executed in the parallel manner and defined in said source program, for seeking a task communication command within each of said plural tasks executed in the parallel manner, and for adding an amount of data communicated by said task with another task in response to said task communication command to an element of a set of task numbers corresponding thereto stored in said communication amount table for tasks; and
- a task schedule means for acquiring data communication time per unit data at a start of task execution, between a processor to be allocated and not yet having been allocated to any task and another processor already allocated to any of the plural tasks from said processor communication cost table, for acquiring and amount of data communicated between said task and another task to which any one of the processors has already been allocated from said task communication amount table, for multiplying said data communication time per said unit data by the data amount of said communication to thereby calculate communication time required for the data communication by calculating data communication times required for data communication between the task in accordance with the data communication time per unit data between the processors and the amount of the data communicated between the tasks and,
- wherein such a processor whose communication time required for said data communication becomes minimum is allocated to such a task to which no processor has been allocated among the plural tasks executed in the parallel manner in accordance with the combination pattern for the shortest data communication time, and also for registering a corresponding relationship between a task number of said task and a processor number of said processor into said processor management table.

9. A process allocating method used in a multiprocessor system including a plurality of processors, each of which processors can execute one of a plurality of tasks in a parallel manner, comprising:
- a task schedule step for allocating when the executing of tasks are started each of said plurality of tasks to one processor of said plurality of processors sequentially in an order minimizing the data communication time per unit data between each processor of said plurality of processors and all other respective processors of said plurality of processors by calculating data communication times required for data communication between the task in accordance with the data communication time per unit data between the processors and the amount of the data communicated between the tasks in accordance with the combination pattern for the shortest data communication time,
- wherein said one processor has not yet been allocated to any task and said task allocation step refers to a processor management table.

10. A processor allocating method used in a multiprocessor system including a plurality of processors, each of which processors can execute one of a plurality of tasks in a parallel manner, comprising:
- a step of providing an inter-task communication amount table for holding an amount of data communicated between each task of the plurality of tasks and other respective tasks of the plurality of tasks;
- a step of providing a processor communication cost table for holding data communication time per unit data between each processor and the other respective processors of said plurality of processors; and
- a task schedule step for calculating data communication times, when the executing of tasks are started, required for data communication between each task and the other respective tasks on the basis of both said inter-task communication amount table and said processor communication cost table, with respect to each of all combination patterns of said tasks and said processors by calculating data communication times required for data communication between the task in accordance with the data communication time per unit data between the processors and the amount of the data communicated between the tasks, and
- allocating said tasks to said processors not yet having been allocated to any task in accordance with the combination pattern for the shortest data communication time in accordance with the combination pattern for the shortest data communication time.

11. A processor allocating method used in a multiprocessor system as claimed in claim 9, further comprising:
- a compile step for compiling a source program in which said plurality of tasks executed in the parallel manner in said multiprocessor are defined to thereby produce an object program.

12. A process allocating method used in a multiprocessor system as claimed in claim 10, further comprising:
- a compile step for compiling a source program in which said plurality of tasks executed in the parallel manner in said multiprocessor are defined to thereby produce an object program; and
- a communication amount among tasks measuring object program step for storing therein an amount of data communicated between each of said plural tasks executed in the parallel manner and another task.

13. A processor allocating method used in a multiprocessor system as claimed in claim 12, wherein:
- said communication amount among tasks measuring object program step seeks a task communication command within each of said plural tasks executed in the parallel manner, and stores therein an amount of data communicated by said task with another task in response to said task communication command.

14. A processor allocating method used in a multiprocessor system capable of executing a plurality of tasks in a parallel manner, comprising:

a step of providing a processor communication cost table holding therein a data communication time per unit data between two arbitrary processors as an element of a matrix, which matrix is exclusively constituted by a set of processor numbers of said two arbitrary processors;

a compile step for compiling a source program in which said plurality of tasks executed in the parallel manner in said multiprocessor are defined to thereby produce an object program; and a task schedule step for obtaining at the time of starting the executing of tasks, such a processor for the processor communication cost table so as to allocate said processor to a task to which the processor has not yet been allocated to any tasks, among said plural tasks executed in the parallel manner, by calculating data communication times required for data communication between the task in accordance with the data communication time per unit data between the processors and the amount of the data communicated between the tasks in such a way that the data communication time between the processor to be allocated and another processor already allocated to any of the plural tasks becomes minimum in accordance with the combination pattern for the shortest data communication time, and also for registering a corresponding relationship between a task number of said task and a processor number of said processor allocated thereto.

15. A processor allocating method used in a multiprocessor system capable of executing a plurality of tasks in a parallel manner, comprising:

a step of providing a communication amount table for tasks, which table holds therein an amount of data communicated between two arbitrary tasks executed in said multiprocessor in the parallel manner as an element of a matrix, exclusively constructed by a set of task numbers of said two arbitrary tasks;

a step of providing a processor communication cost table holding therein a data communication time per unit data between two arbitrary processors as an element of a matrix, which table is exclusively constituted by a set of processor numbers of said two arbitrary processors;

a step of providing a processor management table for holding therein a corresponding relationship between a task number of each of said plural tasks executed in the parallel manner and a processor number of a processor allocated to said task;

a compile step for compiling a source program in which said plurality of tasks executed in the parallel manner in said multiprocessor are defined to thereby produce an object program, for producing said communication amount table for tasks as to said plurality of tasks executed in the parallel manner and defined in said source program, for seeking a task communication command within each of said plural tasks executed in the parallel manner, and for adding an amount of data communicated by said task with another task in response to said task communication command; and a task schedule step for acquiring the data communication time per unit data between a processor to be allocated and another processor already allocated to any of the plural tasks from said processor communication cost table at the start of executing the tasks, for acquiring an amount of data communicated between said task and another task to which any one of the processors has already been allocated from said task communication amount table, for multiplying said data communication time per said unit data by the data amount of said communication to thereby calculate communication time required for the data communication by calculating data communication times required for data communication between the task in accordance with the data communication time per unit data between the processors and the amount of the data communicated between the tasks, wherein such a processor whose communication time required for said data communication becomes minimum is allocated to such a task to which no processor has been allocated to any task among the plural tasks executed in the parallel manner in accordance with the combination pattern for the shortest data communication time, and also for registering a corresponding relationship between a task number of said task and a processor number of said processor into said processor management table.

16. A processor allocating method used in a multiprocessor system capable of executing a plurality of tasks in a parallel manner, comprising:

a step of providing a communication amount table for tasks, which table holds therein an amount of data communicated between two arbitrary tasks executed in said multiprocessor in the parallel manner as an element of a matrix, exclusively constituted by a set of task numbers of said two arbitrary tasks;

a step of providing a processor communication cost table holding therein a data communication time per unit data between two arbitrary processors as an element of a matrix, which matrix is exclusively constituted by a set of processor numbers of said two arbitrary processors;

a step of providing a processor management table for holding therein a corresponding relationship between a task number of each of said plural tasks executed in the parallel manner and a processor number of a processor allocated to said task;

a compile step for compiling a source program in which said plurality of tasks executed in the parallel manner in said multiprocessor are defined to thereby produce an object program;

a communication amount among tasks measuring object program step for producing said communication amount table for tasks as to a plurality of tasks executed in the parallel manner and defined in said source program, for seeking a task communication command within each of said plural tasks executed in the parallel manner, and for adding an amount of data communicated by said task with another task in response to said task communication command to an element of a set of task numbers corresponding thereto stored in said communication amount table for tasks; and at a time of starting the executing of tasks, a task schedule step for acquiring data communication time per unit data between a processor not yet having been allocated to any tasks and to be allocated and another processor already allocated to any of the plural tasks from said processor communication cost table, for acquiring and amount of data communicated between said task and another task to which any one of the processors has already been allocated from said task communication amount table, for multiplying said data communication time per said unit data by the data amount of said communication to thereby calculate communication time required for the data communication by calculating data communication times required for data communication between the task in accordance with the data communication time per unit data between the processors and the amount of the data communicated between the tasks, wherein such a processor whose communication time required for said data communication becomes minimum is allocated to such a task to which no processor has been allocated among the plural tasks executed in the parallel manner in accordance with the combination pattern for the shortest data communication time, and also for registering a corresponding relationship between a task number of said task and a processor number of said processor into said processor management table.

17. A medium for storing therein a processor allocation program for causing a multiprocessor system including a plurality of processors, each of which processors can execute one of a plurality of tasks in a parallel manner to perform a process operation, comprising:

a task schedule step for allocating at the commencement of task execution, each of said tasks to one of said plurality of processors, not yet having been allocated to any task, sequentially in an order minimizing the data communication time per unit data between each processor of said plurality of processors and all other respective processors of said plurality of processors by calculating data communication times required for data communication between the task in accordance with the data communication time per unit data between the processors and the amount of the data communicated between the tasks in accordance with the combination pattern for the shortest data communication time, wherein said task schedule step refers to a processor management table in making the allocation.

18. A medium for storing therein a processor allocation program for causing a multiprocessor system including a plurality of processors, each of which processors can execute one of a plurality of tasks in a parallel manner to perform a process operation, comprising:

a step of providing an inter-task communication amount table for holding an amount of data communicated between each task of the plurality of tasks and other respective tasks of the plurality of tasks;

a step of providing a processor communication cost table for holding data communication time per unit data between each processor and the other respective processors of said plurality of processors; and a task schedule step for calculating, when the executing of tasks is started, data communication times required for data communication between each task and the other respective tasks on the basis of both said inter-task communication amount table and said processor communication cost table, with respect to each of all combination patterns of said tasks and said processors by calculating data communication times required for data communication between the task in accordance with the data communication time per unit data between the processors and the amount of the data communicated between the tasks and, and allocating said tasks to said processors not yet having been allocated to any task in accordance with the combination pattern for the shortest data communication time in accordance with the combination pattern for the shortest data communication time.

19. A medium for storing a processor allocation program for causing a multiprocessor system to perform a process operation, as claimed in claim 17, further comprising:

a compile step for compiling a source program in which said plurality of tasks executed in the parallel manner in said multiprocessor are defined to thereby produce an object program.

20. A medium for storing a processor allocation program for causing a multiprocessor system to perform a process operation, as claimed in claim 18, further comprising:

a compile step for compiling a source program in which said plurality of tasks executed in the parallel manner in said multiprocessor are defined to thereby produce an object program; and a communication amount among tasks measuring object program step for storing therein an amount of data communicated between each of said plural tasks executed in the parallel manner and another task.

21. A medium for storing a processor allocation program for causing a multiprocessor system to perform a process operation, as claimed in claim 20, wherein:

said communication amount among tasks measuring object program step seeks a task communication command within each of said plural tasks executed in the parallel manner, and stores therein an amount of data communicated by said task with another task in response to said task communication command.

22. A medium for storing therein a processor allocation program for causing a multiprocessor system capable of executing a plurality of tasks in a parallel manner to perform a process operation, comprising:

a step of providing a processor communication cost table holding therein a data communication time per unit data between two arbitrary processors as an element of a matrix, which matrix is exclusively constituted by a set of processor numbers of said two arbitrary processors;

a compile step for compiling a source program in which said plurality of tasks executed in the parallel manner in said multiprocessor are defined to thereby produce an object program; and a task schedule step for obtaining, when the executing of tasks is started, such a processor which has not yet been allocated to any tasks for the processor communication cost table so as to calculate data communication times required for data communication between the task in accordance with the data communication time per unit data between the processors and the amount of the data communicated between the tasks and allocate said processor to a task to which the processor has not yet been allocated, among said plural tasks executed in the parallel manner, in such a way that the data communication time between the processor to be allocated and another processor already allocated to any of the plural tasks becomes minimum in accordance with the combination pattern for the shortest data communication time, and also for registering a corresponding relationship between a task number of said task and a processor number of said processor allocated thereto.

23. A medium for storing therein a processor allocation program for causing a multiprocessor system capable of executing a plurality of tasks in a parallel manner to perform a process operation, comprising:

a step of providing a communication amount table for tasks, which table holds therein an amount of data communicated between two arbitrary tasks executed in said multiprocessor in the parallel manner as an element of a matrix, exclusively constructed by a set of task numbers of said two arbitrary tasks;

a step of providing a processor communication cost table holding therein a data communication time per unit data between two arbitrary processors as an element of a matrix, which table is exclusively constituted by a set of processor numbers of said two arbitrary processors;

when the executing of tasks is started, a step of providing a processor management table for holding therein a corresponding relationship between a task number of each of said plural tasks executed in the parallel manner and a processor number of a processor allocated to said task, said processor allocated to said task not having been allocated to any other tasks;

a compile step for compiling a source program in which said plurality of tasks executed in the parallel manner in said multiprocessor are defined to thereby produce an object program, for producing said communication amount table for tasks as to said plurality of tasks executed in the parallel manner and defined in said source program, for seeking a task communication command within each of said plural tasks executed in the parallel manner, and for adding an amount of data communicated by said task with another task in response to said task communication command; and a task schedule step for acquiring the data communication time per unit data between a processor to be allocated and another processor already allocated to any of the plural tasks from said processor communication cost table, for acquiring an amount of data communicated between said task and another task to which any one of the processors has already been allocated from said task communication amount table, for multiplying said data communication time per said unit data by the data amount of said communication to thereby calculate communication time required for the data communication by calculating data communication times required for data communication between the task in accordance with the data communication time per unit data between the processors and the amount of the data communicated between the tasks and, wherein such a processor whose communication time required for said data communication becomes minimum is allocated to such a task to which no processor has been allocated among the plural tasks executed in the parallel manner in accordance with the combination pattern for the shortest data communication time, and also for registering a corresponding relationship between a task number of said task and a processor number of said processor into said processor management table.

24. A medium for storing therein a processor allocation program for causing a multiprocessor system capable of executing a plurality of tasks in a parallel manner to perform a process operation, comprising:

a step of providing a communication amount table for tasks, which table holds therein an amount of data communicated between two arbitrary tasks executed in said multiprocessor in the parallel manner as an element of a matrix, exclusively constituted by a set of task numbers of said two arbitrary tasks;

a step of providing a processor communication cost table holding therein a data communication time per unit data between two arbitrary processors as an element of a matrix, which matrix is exclusively constituted by a set of processor numbers of said two arbitrary processors;

a step of providing a processor management table for holding therein a corresponding relationship between a task number of each of said plural tasks executed in the parallel manner and a processor number of a processor allocated to said task;

a compile step for compiling a source program in which said plurality of tasks executed in the parallel manner in said multiprocessor are defined to thereby produce an object program;

a communication amount among tasks measuring object program step for producing said communication amount table for tasks as to a plurality of tasks executed in the parallel manner and defined in said source program, for seeking a task communication command within each of said plural tasks executed in the parallel manner, and for adding an amount of data communicated by said task with another task in response to said task communication command to an element of a set of task numbers corresponding thereto stored in said communication amount table for tasks; and a task schedule step for acquiring, at the start of task execution, data communication time per unit data between a processor not already allocated to any task and available to be allocated and another processor already allocated to any of the plural tasks from said processor communication cost table, for acquiring and amount of data communicated between said task and another task to which any one of the processors has already been allocated from said task communication amount table, for multiplying said data communication time per said unit data by the data amount of said communication to thereby calculate communication time required for the data communication, wherein such a processor whose communication time required for said data communication becomes minimum is allocated to such a task to which no processor has been allocated among the plural tasks executed in the parallel manner, and also for registering a corresponding relationship between a task number of said task and a processor number of said processor into said processor management table.

* * * * *